United States Patent
Gupta et al.

(10) Patent No.: US 11,550,726 B1
(45) Date of Patent: Jan. 10, 2023

(54) MAINTAINING AN ACTIVE TRACK DATA STRUCTURE TO DETERMINE ACTIVE TRACKS IN CACHE TO PROCESS

(71) Applicant: International Business Machines Corporation, Armonk, NY (US)

(72) Inventors: Lokesh Mohan Gupta, Tucson, AZ (US); Kyler A. Anderson, Sahuarita, AZ (US); Kevin J. Ash, Tucson, AZ (US); Matthew J. Kalos, Tucson, AZ (US); Brian Anthony Rinaldi, Tucson, AZ (US); Beth Ann Peterson, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/389,315

(22) Filed: Jul. 29, 2021

(51) Int. Cl.
| | |
|---|---|
| *G06F 12/08* | (2016.01) |
| *G06F 12/0891* | (2016.01) |
| *G06F 12/02* | (2006.01) |
| *G06F 3/06* | (2006.01) |

(52) U.S. Cl.
CPC ........ *G06F 12/0891* (2013.01); *G06F 3/0619* (2013.01); *G06F 3/0659* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 6,438,661 B1 | 8/2002 | Beardsley et al. | |
| 7,287,139 B2 | 10/2007 | Budaya et al. | |
| 8,448,013 B2 | 5/2013 | Clark et al. | |
| 9,405,669 B2 | 8/2016 | Ash et al. | |
| 9,501,240 B2 | 11/2016 | Benhase et al. | |
| 9,535,610 B2 | 1/2017 | Benhase et al. | |
| 9,665,282 B2 | 5/2017 | Grusy et al. | |
| 9,678,686 B2 | 6/2017 | Gupta et al. | |
| 9,792,061 B2 | 10/2017 | Benhase et al. | |
| 9,940,198 B2 | 4/2018 | Gao et al. | |
| 10,146,452 B2 | 12/2018 | Ash et al. | |
| 2018/0081807 A1 | 3/2018 | Ash et al. | |

OTHER PUBLICATIONS

PCT International Search Report and Written Opinion dated Nov. 15, 2022, for Application NO. PCT EP2022/070268, (18.947).

*Primary Examiner* — Kevin Verbrugge
(74) *Attorney, Agent, or Firm* — Konrad Raynes Davda & Victor LLP; David W. Victor

(57) ABSTRACT

Provided are a computer program product for managing tracks in a storage in a cache. An active track data structure indicates tracks in the cache that have an active status. An active bit in a cache control block for a track is set to indicate active for the track indicated as active in the active track data structure. In response to processing the cache control block, a determination is made, from the cache control block for the track, whether the track is active or inactive to determine processing for the cache control block.

25 Claims, 7 Drawing Sheets

Cache Control Block

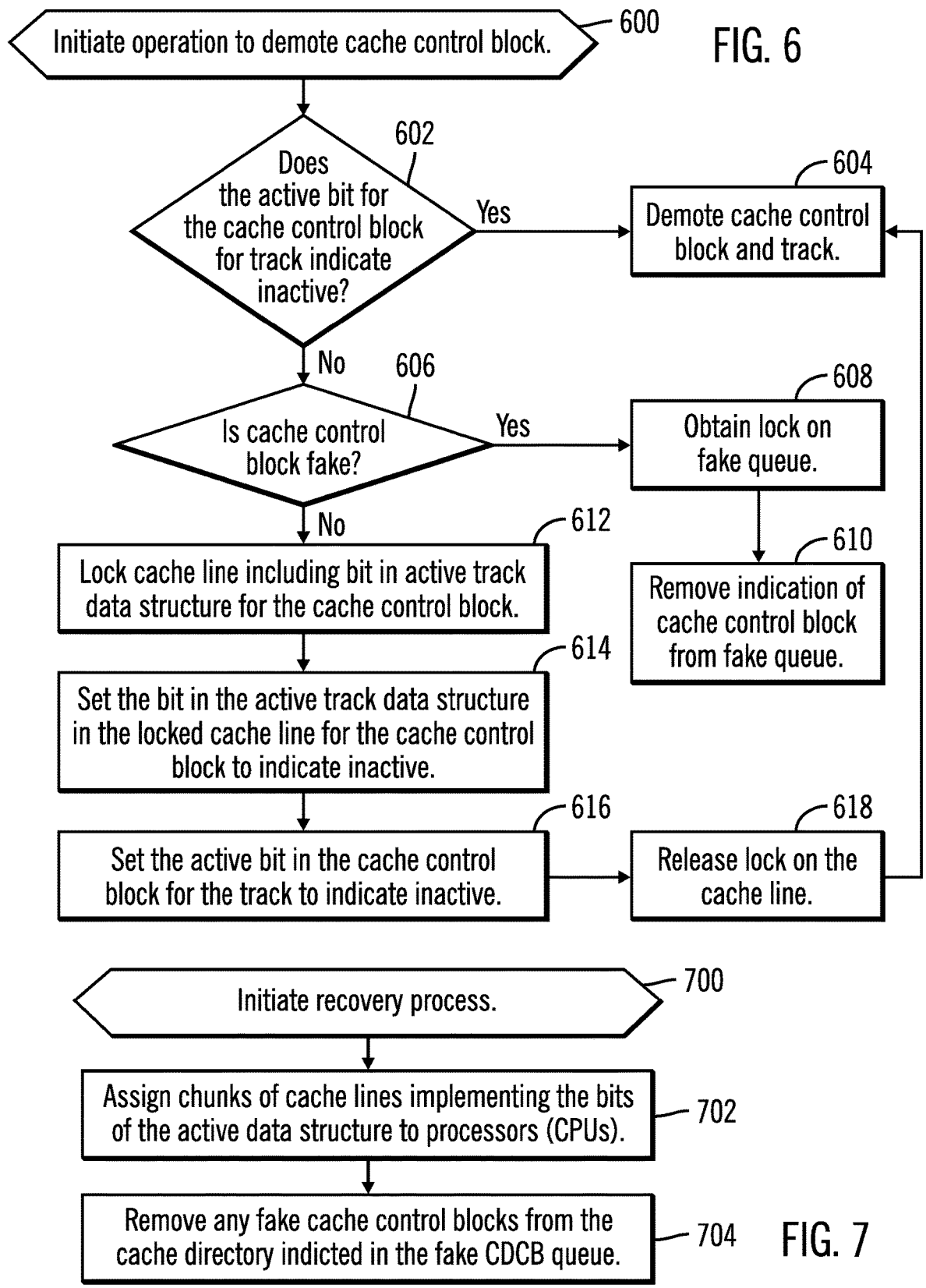

MAINTAINING AN ACTIVE TRACK DATA STRUCTURE TO DETERMINE ACTIVE TRACKS IN CACHE TO PROCESS

BACKGROUND OF THE INVENTION

1. Field of the Invention

The present invention relates to a computer program product, system, and method for maintaining an active track data structure to determine active tracks in cache to process.

2. Description of the Related Art

A cache management system in a storage controller buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency. The cache management system may also return complete to a write request when the modified track directed to the storage device is written to the cache memory and before the modified track is written out to the storage device, such as a hard disk drive. The write latency to the storage device is typically significantly longer than the latency to write to a cache memory. Thus, using cache also reduces write latency.

Storage controller microcode may experience a failure condition due to hardware or software code issues. Upon initialization after such a failure, a warmstart process may be performed to collect and debug data and perform data recovery of cached data, especially modified data in the cache. In order to collect debug data and perform a data recovery, the warmstart recovery process generates a table of active tracks. An active track is one which was under some sort of processing state which is identified with user counts, lock counts, a modified count, waiters, etc. As part of the warmstart or other recovery process, the determined active tracks may be validated, cleaned (or discarded) and/or statesaved. Cache tracks that are not active may not be addressed as part of the warmstart or recovery.

To determine the active tracks to include in the active entry table, the warmstart process may scan the entire cache by processing all the entries in the cache directory (such as scatter index table). This scanning may be done in parallel by different processors processing one chunk of cache directory in parallel until all chunks are processed. The entire cache directory is processed during warmstart. As the cache size increases, if the number of processors and memory speed do not likewise increase, then the time to scan the entire cache directory linearly increases upward as the size of the cache increases.

There is a need in the art for improved techniques to determine active tracks in cache to process during a recovery operation.

SUMMARY

Provided are a computer program product for managing tracks in a storage in a cache. An active track data structure indicates tracks in the cache that have an active status. An active bit in a cache control block for a track is set to indicate active for the track indicated as active in the active track data structure. In response to processing the cache control block, a determination is made, from the cache control block for the track, whether the track is active or inactive to determine processing for the cache control block.

The above embodiment provides an optimization by setting an active bit in the cache control block to indicate the track is active, which avoids the need to obtain a loc to access the active track data structure to determine whether the active track data structure needs to be locked and update when there is a status change with respect to the cache control block. Further indicating in the active track data structure whether tracks have an active status allows the system to quickly determine from the active track data structure whether a track is active.

In a further embodiment, a determination is made from the cache control block whether the track is active is performed in response to obtaining a lock on the cache control block. Indication is made in the active track data structure that the track is active in response to determining from the cache control block that the track is not active. The active bit in the cache control block for the track is set to indicate active.

With the above embodiment, even if the cache control block indicates the track is active, indication may be made in the active track data structure that the track is in fact active, which may occur if other information indicates the track is active even through the cache control block indicates the track is active. The active bit in the cache control block is set to indicate active to match the change made to the active track data structure to allow determination that a track is active or inactive without having to lock the active track data structure to determine whether the track is active or inactive.

In a further embodiment, the determination from the cache control block whether the track is active is performed in response to releasing a lock on the cache control block for the track. Usage information for the cache control block is processed to determine whether the track is active in response to the active bit for the track indicating the track is active. In response to determining that the processing the usage information indicates the track is inactive, indicating in the active track data structure that the track is inactive and setting the active bit in the cache control block for the track to indicate inactive.

With the above embodiment usage information independent of the cache control block is used to confirm whether the active bit in the cache control block indication of active is correct based on the independent usage information. Thus, if the active bit indicates active but the usage information indicates inactive, both the active track data structure and the active bit in the cache control block are updated to indicate inactive to maintain this information synchronized.

In a further embodiment, the active track data structure comprises a bitmap including bits for cache control blocks. A bit for a cache control block indicates whether a track identified by the cache control block is active or inactive.

In a further embodiment, the bits of the bitmap are implemented in cache lines. A lock is obtained on a cache line having a portion of the bitmap including a bit for the cache control block. The bit in the bitmap for the cache control block is set to indicate active or inactive in response to locking the cache line. The lock on the cache line is released in response to setting the bit for the cache control block.

With the above embodiment, by implementing the bits of the active track data structure in a bitmap in cache lines, multiple portions of the bitmap in different cache liens may be accessed concurrently by different locks for the different cache lines being independently held to allow multiple processes to concurrently determine whether different tracks are indicated as active in the bitmap of the active track data structure. This improves operations to scan the active track data structure bitmap to determine active tracks during an operation where this needs to be determined, such as during recovery.

In a further, embodiment, in response to initiating an operation to demote a track from the cache and the active bit in a cache control block for the track to demote indicating active, indicating in the active track data structure that the track to demote is inactive and setting the active bit in the cache control block for the track to demote to indicate inactive.

In the above embodiment, to ensure that a track status of inactive or active is always maintained current, when demoting a track from the cache, both the active track data structure and the active bit in the cache control block are set to indicate the bit for the track to demote is inactive.

Further provided are a computer program product for managing tracks in a storage in a cache. An active track data structure indicates tracks in the cache that have an active status. The active track data structure is processed to determine indicated active tracks. A recovery operation is performed of save a state, validate and/or discard for the determined indicated active tracks.

With the above embodiment, the active track data structure indicating active and inactive track is used during a recovery operation to determine the active tracks for which recovery operations may be performed. Using the active track data structure avoids the need to scan and process tracks in the cache and in other information to determine whether tracks are active.

In a further embodiment, in response to determining that there are no available cache control blocks to allocate for a track to add to the cache, creating an alternative block structure to represent a cache control block for the track to add to the cache. Indication is made of the alternative block structure in a cache directory index also indicating the cache control blocks. The alternative block structure is indicated in a queue. In response to the recovery process, determining alternative block structures indicated in the queue and removing the determined alternative block structures from the cache directory index.

With the above embodiment, if an alternative block structure is used to represent a cache control block, which is not available, for a track to add to cache. The alternative block structure may be converted to cache control blocks once resources become available to be assigned to a cache control block. The queue of indicated alternative block structures is used during the recovery process to allow ready determination of such alternative block structures, also known as fake cache control blocks, to remove from the cache directory index.

In a further embodiment, track usage information in cache control blocks for the indicated active tracks is processed to determine whether the tracks indicated as active in the active track data structure are active. The recovery operation is performed with respect to those tracks indicated as active in the active track data structure that are also determined active from the track usage information.

With the above embodiment, even if a track is indicated in a cache control block is active, this status may be overridden by processing track usage information to determine whether a track is active or inactive, such that a recovery operation is performed only for those tracks that are not just indicated as active in the active track data structure but also determined to be active from the track usage information.

BRIEF DESCRIPTION OF THE DRAWINGS

FIG. 6 illustrates an embodiment of operations to demote a cache control block from cache.

FIG. 7 illustrates an embodiment of operations to initiate recovery processing.

DETAILED DESCRIPTION

In current implementations, the entire cache or cache directory is scanned to determine active tracks in cache to process during a recovery operation after a failure. Described embodiments provide improvements to computer caching technology to determine active tracks in cache as part of an initialization or recovery operation. Described embodiments provide an active cache data structure that indicates whether tracks in the cache are active. During regular Input/Output (I/O) operations, an active bit in the cache control block indicating whether the active track data structure indicates that the cache control block is active is used to determine whether to update the active track data structure to indicate active or inactive. Using the active bit in the cache control block optimizes processing operations by avoiding the need to obtain a lock to access the active track data structure in order to determine whether the bit in the active track data structure for the cache control block needs to be updated when there is a status change with respect to the cache control block.

Described embodiments update the active track data structure actively during production I/O operations to cache to accurately reflect whether tracks are inactive or active. During a recovery operation, such as a warmstart, the active track data structure may be processed to determine active tracks to subject to recovery operations, such as statesave, validation, discarding, etc., and tracks that are inactive may not be subject to the recovery operations. Described embodiments avoid having to scan the entire cache and cache directory to determine active tracks to process during recovery operations.

Figure 1:
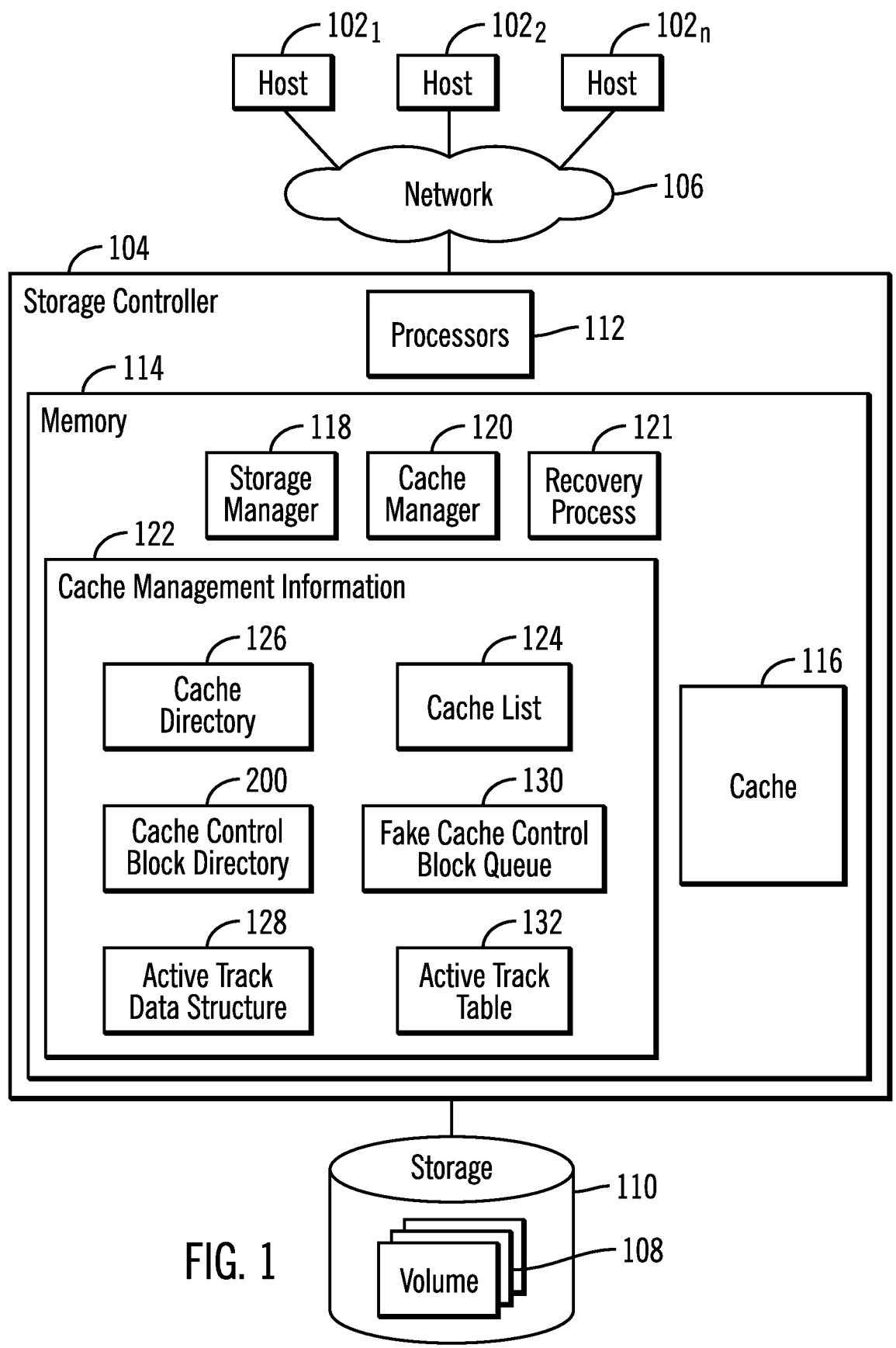
FIG. 1 illustrates an embodiment of a computing environment.

FIG. 1 illustrates an embodiment of a computing environment. A plurality of hosts $102_1, 102_2 \ldots 102_n$ may submit Input/Output (I/O) requests to a storage controller 104 over a network 106 to access data at volumes 108 (e.g., Logical Unit Numbers, Logical Devices, Logical Subsystems, etc.) in a storage 110. The storage controller 104 includes one or more processors 112 and a memory 114, including a cache 116 to cache data for the storage 110. The processors 112 may comprise a separate central processing unit (CPU), one or a group of multiple cores on a single CPU, or a group of processing resources on one or more CPUs. The cache 116 buffers data transferred between the hosts 102₁, 102₂ . . . 102ₙ and volumes 108 in the storage 110.

The memory 114 further includes a storage manager 118 for managing the transfer of tracks transferred between the hosts 102₁, 102₂ . . . 102ₙ and the storage 110; a cache manager 120 that manages data transferred between the hosts 102₁, 102₂ . . . 102ₙ and the storage 110 in the cache 116; and a recovery process 121 to perform an initialization of the storage controller 104, such as may occur if the storage controller 104 operating system is abnormally terminated or otherwise restarted. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

In certain implementations, such as with the International Business Machines Corporation ("IBM") Z/OS® operating system, each segment may have an associated descriptor referred to as a cache segment control block (CSCB), where one of the CSCBs is cast as a cache control block, referred to as cache directory control block (CDCB). The cache 116 may be divided into 4K segments. Each track in cache can have up to seventeen CSCBs. One of the CSCBs in the track is designated as the cache control block, also referred to as a CDCB (Cache Directory Control Block) and holds all the track related control information. There is one cache control block for each track in the cache 116 providing metadata on the track in the cache 116. (Z/OS is a registered trademark of IBM throughout the world).

The recovery process 121 performs a system initialization of the storage controller 104 to recover state information from existing data structures to provide a faster initialization and recovery than a cold start. In enterprise storage controllers, such as the IBM DS8000™ storage controllers, the recovery process, which may be referred to as a "warmstart", may be used as both a debug mechanism and a recovery method. The recovery process 121 may initiate a state-save operation to collect state-save data. This state-save data may contain data structures that are deemed necessary to analyze the problem or condition that necessitated the recovery. The recovery process 121 may reinitialize data structures in the storage controller 104, rebuild linked lists, and restore the storage controller 104 to a more known state. During the recovery, there are periods of time where I/O may be blocked and therefore must be redriven. (DS8000 is a trademark of IBM throughout the world)

The cache manager 120 maintains cache management information 122 in the memory 114 to manage read (unmodified) and write (modified) tracks in the cache 116. The cache management information 122 may include a least recently used (LRU) cache list 124 in which to indicate tracks in the cache 116 to determine which track to demote from the cache 116; a cache directory 126 providing an index of cache control blocks 200ᵢ or segment descriptors to locations of segments in cache having the cache control block 200ᵢ or segment identified in the cache directory 126; an active track data structure 128 indicating active tracks in the cache 116; a fake cache control block queue 130 indicating cache control blocks represented by alternative data structures when there are no remaining cache control blocks to allocate; and an active track table 132 generated during the recovery process 121 to indicate active tracks in the cache 116 for recovery processing.

In one embodiment, the active track data structure 128 may comprise a bitmap having a bit for each segment in the cache 116. A track may be allocated multiple segments in the cache 116, and the cache control block 200ᵢ for a track, having metadata for the track, may reside in one of the segments allocated to the track. The bit in the bitmap 128 corresponding to the cache control block 200ᵢ for the track may be set to indicate the track is active or inactive. The bits in the active track data structure 128 bitmap representing segments having track data and not the cache control block 200ᵢ are left unused. Portions or bits of the active track data structure 128 bitmap may be implemented in cache lines that need to be locked to process the bits to determine whether corresponding cache control blocks 200ᵢ are active.

The cache directory 126 may indicate cache control blocks 200ᵢ for tracks in the cache 116 and alternative data structures, also known as fake cache control blocks, that represent cache control blocks when there are no more segments to assign to a track to add to cache. In such case, a fake cache control block is added to the cache directory 126 so that there is only one request pending to allocate a cache control block for a track. The data for the track for which a fake cache control block is created is not stored in the cache 116 until a cache control block 200ᵢ is allocated to replace the fake cache control block. The fake cache control block may be implemented as a task control block (TCB), which may have cache control block 200ᵢ information, such as the fake flag 210 and an identifier 202.

In certain embodiments, the cache directory 126 may be implemented as a scatter index table, where a track address or cache control block identifier is hashed to an entry in the table. If the cache 116 has data for that cache control block or track, the entry in the cache directory 126 to which the value hashes would have a pointer to a location in cache 116 where the cache control block 200ᵢ segment for a track is stored.

The storage manager 118, cache manager 120, and recovery process 121 are shown in FIG. 1 as program code loaded into the memory 114 and executed by one or more of the processors 112. Alternatively, some or all of the functions may be implemented as microcode or firmware in hardware devices in the storage controller 104, such as in Application Specific Integrated Circuits (ASICs).

The storage 110 may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 114 may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts 102₁, 102₂ . . . 102ₙ may connect to the storage controller 104 over a bus interface, such as a Peripheral Component Interconnect (PCI) bus interface and other interfaces known in the art.

Figure 2:
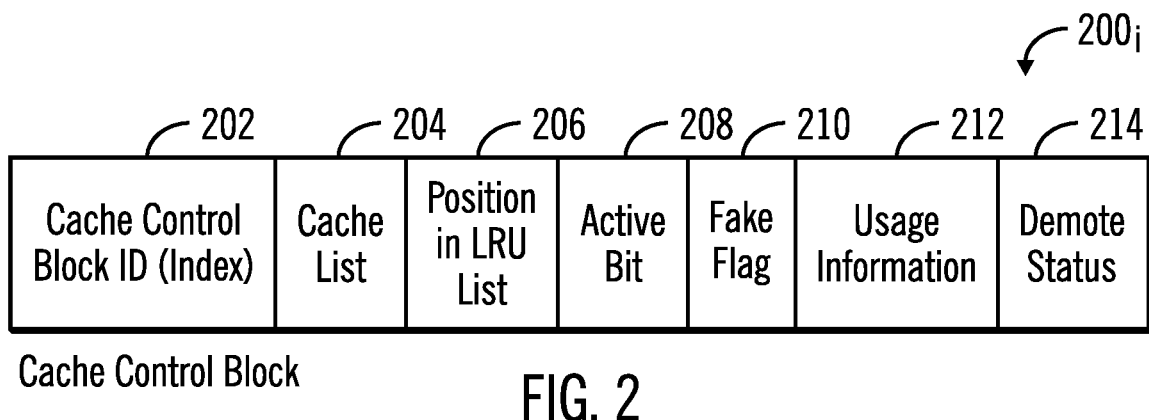
FIG. 2 illustrates an embodiment of a cache control block.

FIG. 2 illustrates an embodiment of an instance of a cache control block $200_i$ for one of the tracks in the cache 116, including, but not limited to, a cache control block identifier 202, such as an index value of the cache control block $300_i$; the cache list 204 in which the track associated cache control block $200_i$ is indicated; a position in the LRU cache list 206 where the track is indicated; an active bit 208 indicating whether the track is indicated as active in the active track data structure 128; a fake flag indicating whether the cache control block 202 is in fact not implemented with cache segments, but instead implemented with an alternative data structure, such as a task control block; usage information 212 providing usage statistics on the track in the cache, such as active user count, active write count, lock counts, modified count, waiters, etc.; and a demote status 214 indicating whether the track identified by the cache control block $200_i$ is to be demoted from the cache 116. Additional information may be included in the cache control block $200_i$ not mentioned herein that is used to manage the track in the cache 116.

The active bit 208 provides an optimization to indicate whether the active track data structure 128 indicates the track is active. This allows a process to determine that the track is active without having to obtain a lock on the cache line to read the bit in the active track data structure 128 for the cache control block $200_i$. This allows processes during normal operations to determine whether the bit in the active track data structure 128 needs to be reset without having to lock the cache line having the bit to read to determine if that bit indicates active or inactive.

Figure 3:
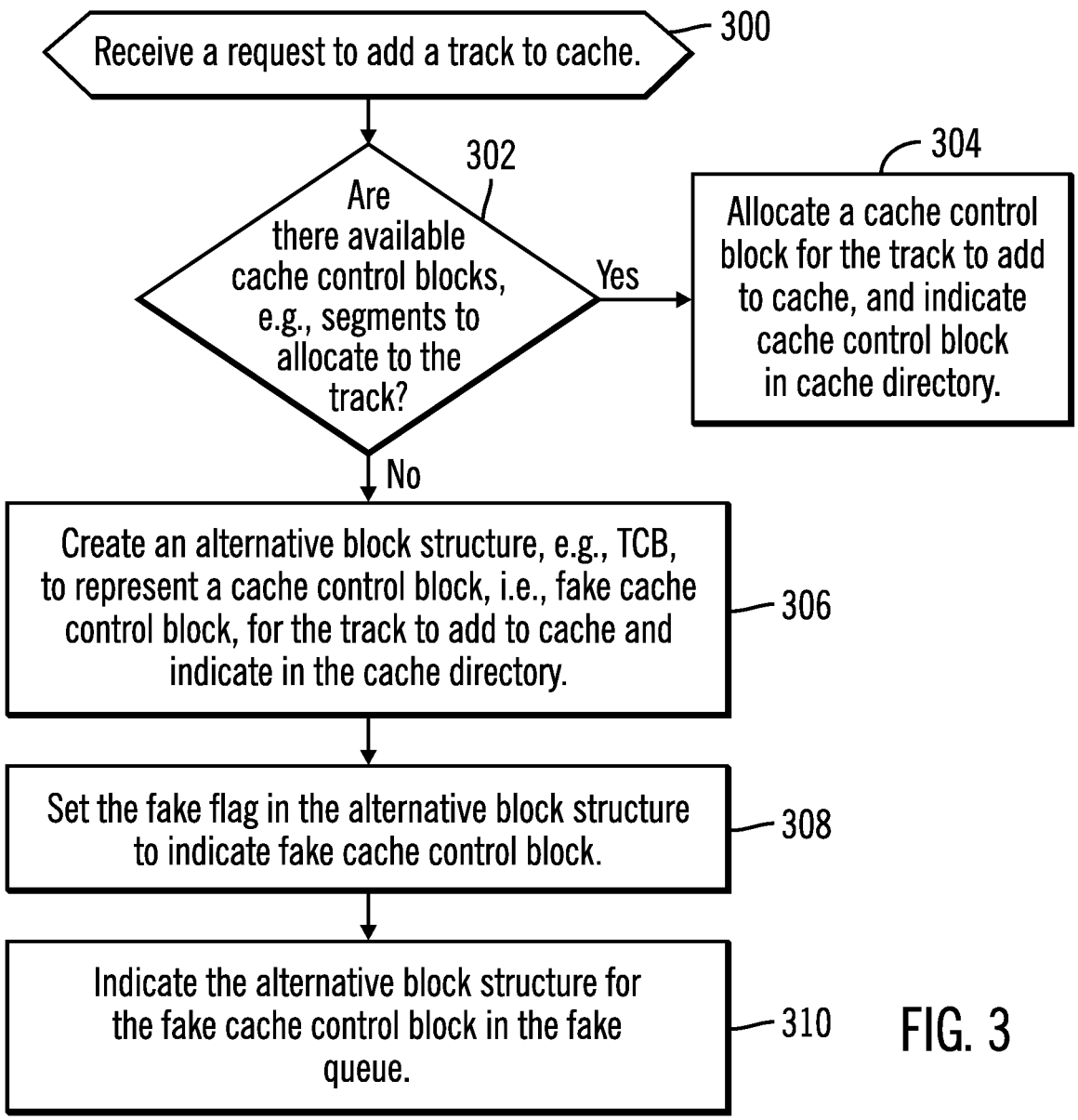
FIG. 3 illustrates an embodiment of operations to process a request to add a track to cache.

FIG. 3 illustrates an embodiment of operations performed by the cache manager 120 to process a request to add a track to the cache 116 from one of the hosts $102_1$, $102_2$ ... $102_n$. Upon receiving (at block 300) a request to add a track to the cache 116, a determination is made if there are available segments in the cache 116 to allocate a cache control block $200_i$ for the request. If (at block 302) there are available segments, then a new cache control block $200_i$ is allocated (at block 304) and indicated in the cache directory 126 for the track. The track may then be added to the cache 116. If (at block 302) there are not available segments, or cache segment control blocks to allocate a cache control block $200_i$ to the track, then the cache manager 120 creates (at block 306) an alternative block structure, such as a task control block, to represent a cache control block, also known as a fake cache control block. This fake cache control block may be indicated in the cache directory 126. The fake flag 210 in the alternative block data structure is set (at block 3008) to indicate the cache control block is fake, or a placeholder until segments are available to allocate for a cache control block $200_i$. The alternative block structure for the fake cache control block is indicated (at block 310) in the fake cache control block queue 130.

With the embodiment of operations of FIG. 3, information on a fake cache control block is indicated in the fake queue 130 to allow for fast determination of fake cache control blocks during warmstart or recovery processing. This allows for a fast determination of the fake cache control blocks that may be discarded because there is no data in the cached 116 for fake cache control blocks.

Figure 4:
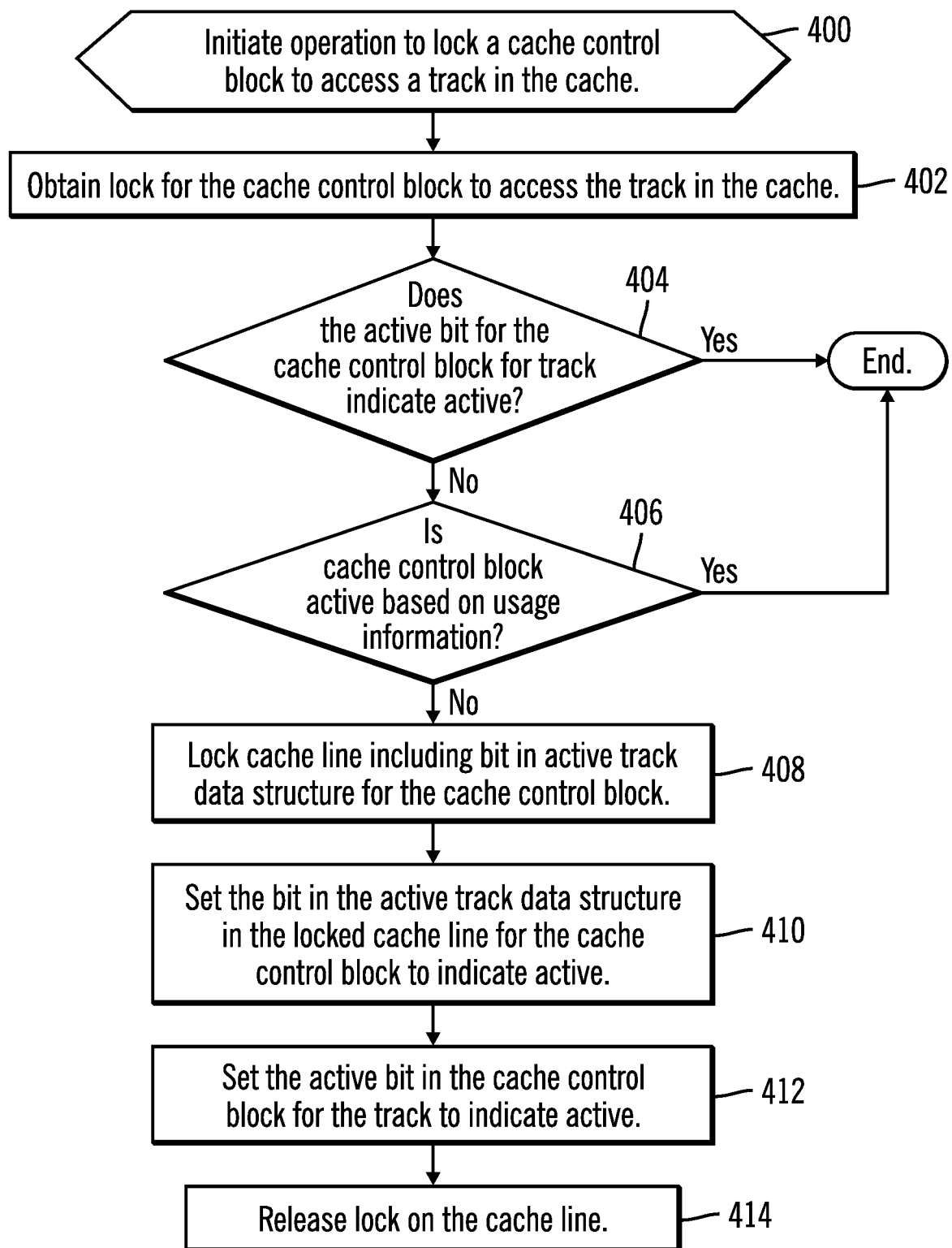
FIG. 4 illustrates an embodiment of operations to lock a cache control block to access a track in the cache.

FIG. 4 illustrates an embodiment of operations performed by the cache manager 120 to lock a cache control block $200_i$ to access a track in the cache 116. Upon initiating (at block 400) the operation to obtain a lock on the cache control block $200_i$, the cache manager 120 obtains (at block 402) a lock for the cache control block $200_i$ to access, which lock may be obtained through the cache directory 126. If (at block 404) the active bit 208 for the cache control block $200_i$ indicates active, then control ends because this is the correct setting for a cache control block $200_i$ being accessed. If (at block 404) the active bit 208 indicates inactive and if (at block 406) the fake flag 210 indicates the cache control block is not fake, such as a TCB, then the cache manager 120 obtains (at block 408) a lock on the cache line including the bit in the active track data structure 128 for the cache control block $200_i$. The bit in the locked cache line is then set (at block 410) to indicate active as the cache control block $200_i$ and track are being accessed. The active bit 208 in the cache control block $200_i$ is also set to indicate active. The lock on the cache line including the set bit for the cache control block $200_i$ in the active track data structure 128 is then released. If (at block 406) the fake flag 210 indicates the cache control block is not comprised of cache segments, but of another data structure, then control ends without taking further action.

With the embodiment of operations of FIG. 4, upon accessing a cache control block $200_i$ to access the track in the cache 116, a determination is made as to whether the active bit in the active track data structure 128 needs to be updated. In certain embodiments, to determine if an update is needed, an exclusive lock is obtained on the cache line having the bit to update by checking an active bit 208 in the cache control block to determine whether the active track data structure 128 does in fact need to be updated. This optimization avoids the need to lock and access a bit in the active track data structure 128 by first checking if the active bit actually needs to be set. Further, the active track data structure 128 is updated with current information on an active status for a track to maintain the active track data structure 128 with current information on active track status to further optimize a warmstart or recovery operation.

Figure 5:
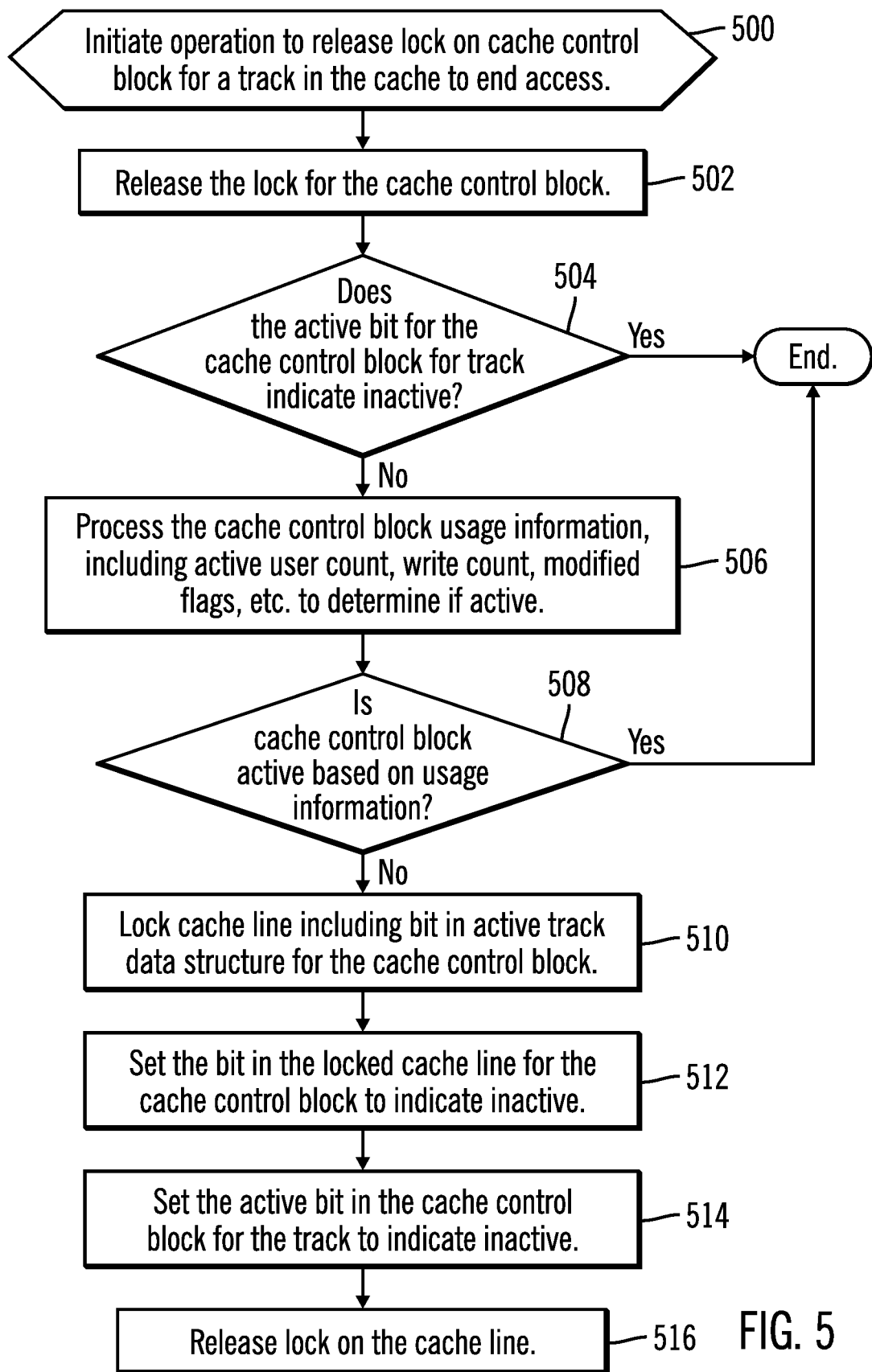
FIG. 5 illustrates an embodiment of operations to release a lock to a cache control block.

FIG. 5 illustrates an embodiment of operations performed by the cache manager 120 to release a lock on a cache control block $200_i$ after completing access to a track in the cache 116. Upon initiating (at block 500) an operation to release a lock for a cache control block $200_i$, the cache manager 120 releases (at block 502) the lock. If (at block 504) the active bit 208 for the cache control block $200_i$ indicates inactive, then control ends because that is the correct state because access to the cache control block $200_i$ is being relinquished. If (at block 504) the active bit 208 indicates active, then the cache manager 120 processes (at block 506) the cache control block usage information 212, such as an active user count, write count, modified flags, etc. to determine if the track is active based on usage information 212. If (at block 508) the cache control block $200_i$ is in fact active, then control ends because the active track data structure 128 indicates the active state.

If (at block 508) the usage information 212 indicates the track is not active, contradicting the active bit 208, then the cache manager 120 locks (at block 510) the cache line including the bit in the active track data structure 128 for the cache control block $200_i$ and sets (at block 512) the bit in the locked cache line for the cache control block $200_i$ to indicate inactive. The active bit 208 in the cache control block $200_i$ is set (at block 514) to indicate inactive. The lock on the cache line is then released (at block 516).

With the embodiment of operations of FIG. 5, upon releasing access to a track/cache control block $200_i$, a determination is made as to whether the active bit in the active track data structure 128 needs to be updated to indicate inactive by checking an active bit 208 in the cache control block to determine whether the active track data structure 128 does in fact need to be updated to indicate inactive. This optimization avoids the need to lock and access a bit in the active track data structure 128 by checking if the active bit 208 indicates the bit in the active data structure 1289 needs to be reset. Further, if the active bit 208 indicates the track is inactive, then the cache manager 120 confirms that other usage information 212 indicate that the track is still active even though the active track data structure 128/active bit 208 indicates the track is not active. If the track is determined to be active even though active bit 208 and the active track data structure 128 indicates the track is inactive, then the information 208, 128 needs to be reset to indicate active for the track to reflect the current status of the track based on the usage information 212. This updates the active track data structure 128 with current information on an active status for a track to optimize a warmstart or recovery operation.

FIG. 6 illustrates an embodiment of operations performed by the cache manager 120 to demote a cache control block $200_i$ and corresponding track from the cache 116, such as using the cache list 124 to select a least recently used track to remove from the cache 116. Upon initiating (at block 600) an operation to demote a cache control block $200_i$ and corresponding track from the cache 116, if (at block 602) the active bit 208 for the cache control block $200_i$ indicates the cache control block $200_i$ is inactive, then the cache control block $200_i$ and track are demoted (at block 604). If the active bit 208 indicates active, then if (at block 606) the fake flag 210 indicates the cache control block is fake, then a lock is obtained (at block 608) on the fake cache control block queue 130 and indication of the fake cache control block is removed from the fake queue 130. At this point, control ends without demoting information because there is no allocated cache control block $200_i$ or track in cache 116 to demote as the cache control block is fake, i.e., is an alternative data structure, such as a TCB.

If (at block 606) the fake flag 210 does not indicate the cache control block $200_i$ top demote is fake, then the cache manager 120 locks (at block 612) the cache line including the bit in the active track data structure 128 for the cache control block $200_i$ and sets (at block 614) the bit in the locked cache line for the cache control block $200_i$ to indicate inactive. The active bit 208 in the cache control block $200_i$ is set (at block 616) to indicate inactive. The lock on the cache line is then released (at block 618). Control then proceeds to block 604 to demote the cache control block $200_i$ and corresponding track from the cache 116. The cache directory 126 may also be updated to indicate there is no data in cache 116 for the demoted cache control block $200_i$.

With the embodiment of operations of FIG. 6, the active track data structure 128 is updated to indicate a cache control block $200_i$ is inactive if the cache control block is being demoted from the cache 116.

FIG. 7 illustrates an embodiment of operations performed by the recovery process 121 to initiate a recovery or warmstart initialization of the storage controller 104. Upon initiating (at block 700) a recovery, chunks of cache lines implementing the bits of the active data structure 128 are assigned (at block 702) to the processors 112 to allow parallel and concurrent processing of the chunks of cache lines implementing the active track data structure 128 to reduce the latency of the recovery process. The recovery process 121 removes (at block 704) any fake cache control blocks indicated in the fake cache control block queue 130 from the cache directory 126.

Figure 8:
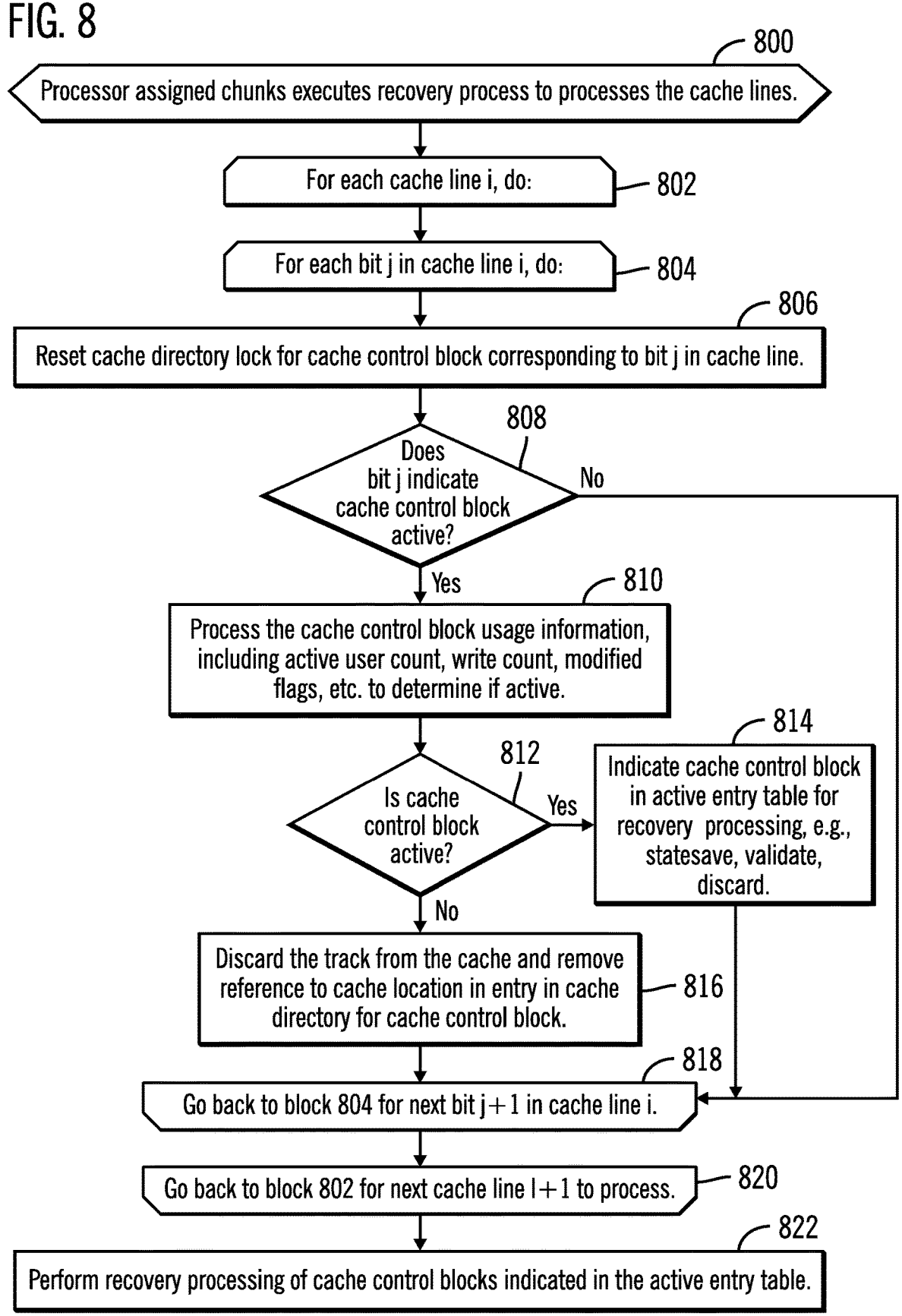
FIG. 8 illustrates an embodiment of operations by a processor assigned a chunk of cache lines to execute the recovery process to determine active tracks.

FIG. 8 illustrates an embodiment of operations performed by each processor 112, assigned a chunk of cache lines having the active track data structure 128, executing the recovery process 121. This allows for parallel processing of the active track data structure 128 during recovery operations by having different processors 112 execute the recovery process 121 to concurrently process the active track data structure 128 cache lines. Upon one of the processors 112 assigned chunks of cache lines having bits of the active track data structure 128 executing (at block 800) the recovery process 121, a loop of operations is performed at blocks 802 through 822 for each cache line i assigned to the processor 112. For each cache line i, the recovery process 121 performs a loop of operations at blocks 804 through 820 for each bit j in cache line. At block 806, the recovery process 121 resets (at block 806) the cache directory lock for the cache control block corresponding to bit j in cache line i to unlocked. If (at block 808) bit j indicates the cache control block $200_i$ is active, then the cache control block usage information 212 is processed (at block 810), including active user count, write count, modified flags, etc., to determine if the track is in fact active.

If (at block 812) the cache control block $200_i$ is active, then that cache control block is indicated (at block 814) in the active track table 132 for recovery processing, such as state save, validate, discard, etc. If (at block 812) the cache control block $200_i$ corresponding to bit j is not active, based on usage information 212, and if (at block 816) the track is not empty nor needs to be discarded, then control proceeds to block 814 to indicate the cache control block in the active track table 132 for recovery processing. If (at block 816) the track is empty or needs to be discarded, then the track and cache control block $200_i$ are discarded (at block 816) from cache and the reference to a cache 116 location in the entry in the cache directory 126 for the cache control block $200_i$ is removed/voided, to indicate there is no cached data for that cache control block $200_i$ and track. From block 814 or 818, control proceeds to block 820 to process the next bit j+1 in cache line i. After processing all bits in cache line i, control proceeds to block 822 to process a next cache line of the active track data structure 128 assigned to the processor 112 until all assigned cache lines are processed.

After forming an active track table 132 of all active cache control blocks $200_i$ for active tracks, the recovery process 121 performs (at block 824) recovery processing of the active cache control blocks $200_i$ indicated in the active track table 132, such as determining whether to perform a state-save for later debugging, validate, clean or discard the data.

With the embodiment of FIG. 8, concurrently executing recovery processes 121 may determine active cache control blocks using the active track data structure 128 to form an active entry table 132. This technique optimizes the processing to determine active cache control blocks $200_i$ by scanning the active track data structure 128 to determine those tracks that are active, which has substantially less latency than techniques that scan all the tracks in the cache directory 126 to determine active tracks. The active track data structure 128, by maintaining one bit for every cache segment in cache, including cache control block segments, requires substantially less scanning than scanning all the entries in the cache directory 126.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the described embodiment, variables i, j, n, etc., when used with different elements may denote a same or different instance of that element.

The computational components of FIG. 1, including the hosts $102_1$, $102_2$ ... $102_n$ and storage controller 104, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

Figure 9:
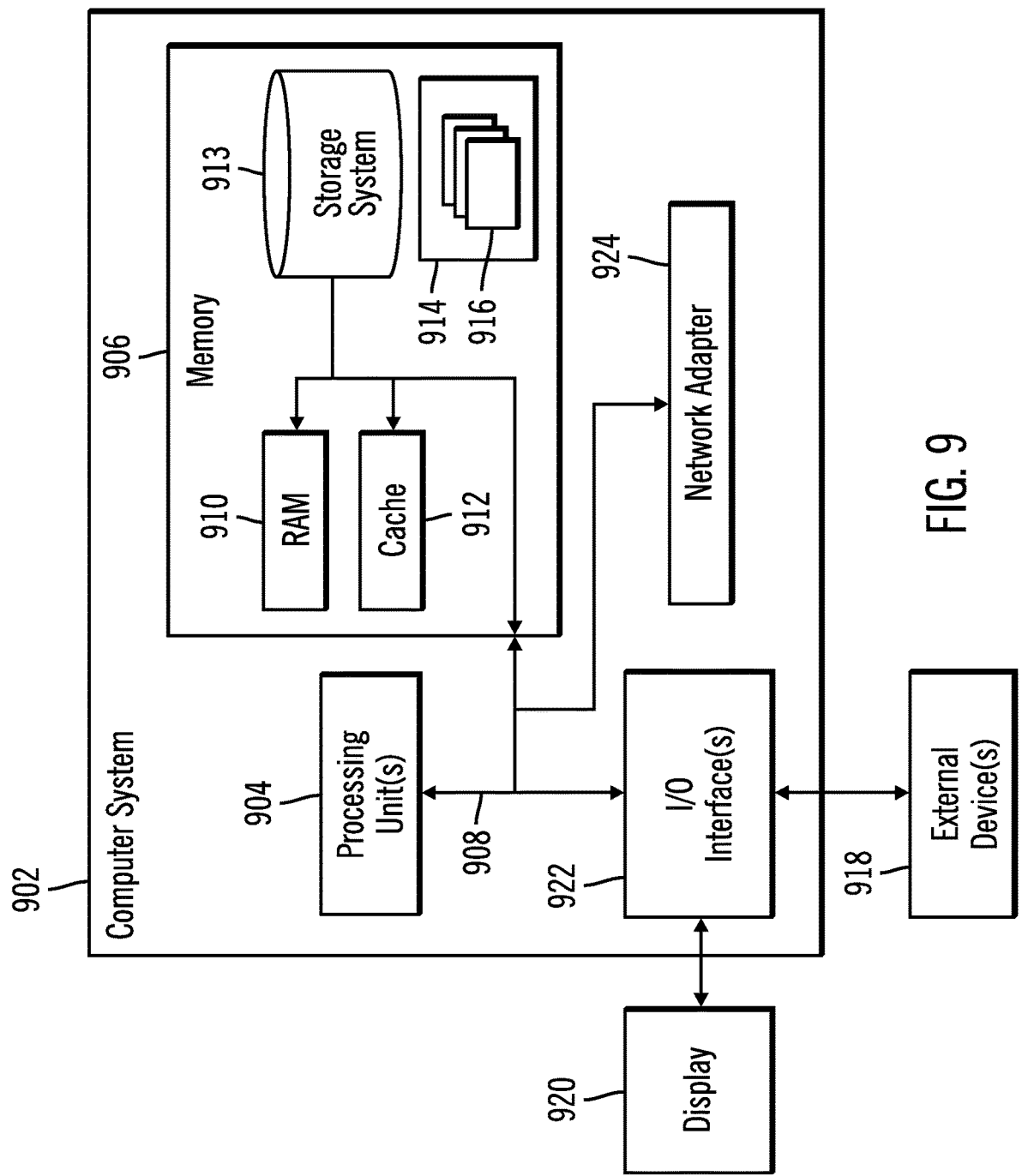
FIG. 9 illustrates a computing environment in which the components of FIG. 1 may be implemented.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing tracks in a storage in a cache, the computer program product comprising a computer readable storage medium having computer readable program code embodied therein that when executed performs operations, the operations comprising:

maintaining an active track data structure indicating tracks in the cache that have an active status;

setting an active bit in a cache control block for a track to indicate active for the track indicated as active in the active track data structure; and in response to processing the cache control block, determining from the cache control block for the track whether the track is active or inactive to determine processing for the cache control block.

2. The computer program product of claim 1, wherein the processing the cache control block comprises obtaining or releasing a lock on the cache control block.

3. The computer program product of claim 1, wherein the determining from the cache control block whether the track is active is performed in response to obtaining a lock on the cache control block, wherein the operations further comprise:

indicating in the active track data structure that the track is active in response to determining from the cache control block that the track is not active; and setting the active bit in the cache control block for the track to indicate active.

4. The computer program product of claim 1, wherein the determining from the cache control block whether the track is active is performed in response to releasing a lock on the cache control block for the track, wherein the operations further comprise:

processing usage information for the cache control block to determine whether the track is active in response to the active bit for the track indicating the track is active; and in response to determining that the processing the usage information indicates the track is inactive, performing:

indicating in the active track data structure that the track is inactive; and setting the active bit in the cache control block for the track to indicate inactive.

5. The computer program product of claim 1, wherein the active track data structure comprises a bitmap including bits for cache control blocks, wherein a bit for a cache control block indicates whether a track identified by the cache control block is active or inactive.

6. The computer program product of claim 5, wherein the bits of the bitmap are implemented in cache lines, wherein the operations further comprise:

obtaining a lock on a cache line having a portion of the bitmap including a bit for the cache control block;

setting the bit in the bitmap for the cache control block to indicate active or inactive in response to locking the cache line; and releasing the lock on the cache line in response to setting the bit for the cache control block.

7. The computer program product of claim 1, wherein the operations further comprise:

in response to initiating an operation to demote a track from the cache and the active bit in a cache control block for the track to demote indicating active, performing:

indicating in the active track data structure that the track to demote is inactive; and setting the active bit in the cache control block for the track to demote to indicate inactive.

8. A computer program product for managing tracks in a storage in a cache, the computer program product comprising a computer readable storage medium having computer readable program code embodied therein that when executed performs operations, the operations comprising:

maintaining an active track data structure indicating tracks in the cache that have an active status;

processing the active track data structure to determine indicated active tracks; and performing a recovery operation of save a state, validate and/or discard for the determined indicated active tracks.

9. The computer program product of claim 8, wherein the processing the active track data structure and the performing the recovery operation are part of a recovery process during initialization of a system including the cache after a system failure.

10. The computer program product of claim 9, wherein the operations further comprise:

in response to determining that there are no available cache control blocks to allocate for a track to add to the cache, creating an alternative block structure to represent a cache control block for the track to add to the cache;

indicating the alternative block structure in a cache directory index also indicating the cache control blocks;

indicating the alternative block structure in a queue;

in response to the recovery process, determining alternative block structures indicated in the queue; and removing the determined alternative block structures from the cache directory index.

11. The computer program product of claim 8, wherein the active track data structure comprises a bitmap including bits for cache control blocks, wherein a bit for a cache control block indicates whether a track identified by the cache control block is active or inactive, and wherein the operations further comprise:

assigning groups of cache lines including portions of the bitmap to different processors to concurrently process to determine indicated active tracks, determine whether to save the state, save the state, and remove the indicated active tracks.

12. The computer program product of claim 8, wherein the operations further comprise:

processing track usage information in cache control blocks for the indicated active tracks to determine whether the tracks indicated as active in the active track data structure are active, wherein the recovery operation is performed with respect to those tracks indicated as active in the active track data structure that are also determined active from the track usage information.

13. A system for managing tracks in a storage in a cache, comprising:

at least one processor; and a computer readable storage medium having computer readable program code that when executed by the at least one processor performs operations, the operations comprising:

maintaining an active track data structure indicating tracks in the cache that have an active status;

setting an active bit in a cache control block for a track to indicate active for the track indicated as active in the active track data structure; and in response to processing the cache control block, determining from the cache control block for the track whether the track is active or inactive to determine processing for the cache control block.

14. The system of claim 13, wherein the determining from the cache control block whether the track is active is performed in response to obtaining a lock on the cache control block, wherein the operations further comprise:
  indicating in the active track data structure that the track is active in response to determining from the cache control block that the track is not active; and
  setting the active bit in the cache control block for the track to indicate active.

15. The system of claim 13, wherein the determining from the cache control block whether the track is active is performed in response to releasing a lock on the cache control block for the track, wherein the operations further comprise:
  processing usage information for the cache control block to determine whether the track is active in response to the active bit for the track indicating the track is active; and
  in response to determining that the processing the usage information indicates the track is inactive, performing:
  indicating in the active track data structure that the track is inactive; and
  setting the active bit in the cache control block for the track to indicate inactive.

16. The system of claim 13, wherein the active track data structure comprises a bitmap including bits for cache control blocks, wherein a bit for a cache control block indicates whether a track identified by the cache control block is active or inactive, wherein the bits of the bitmap are implemented in cache lines, wherein the operations further comprise:
  obtaining a lock on a cache line having a portion of the bitmap including a bit for the cache control block;
  setting the bit in the bitmap for the cache control block to indicate active or inactive in response to locking the cache line; and
  releasing the lock on the cache line in response to setting the bit for the cache control block.

17. The system of claim 13, wherein the operations further comprise:
  in response to initiating an operation to demote a track from the cache and the active bit in a cache control block for the track to demote indicating active, performing:
  indicating in the active track data structure that the track to demote is inactive; and
  setting the active bit in the cache control block for the track to demote to indicate inactive.

18. A system for managing tracks in a storage in a cache, comprising:
  at least one processor; and
  a computer readable storage medium having computer readable program code that when executed by the at least one processor performs operations, the operations comprising:
    maintaining an active track data structure indicating tracks in the cache that have an active status;
    processing the active track data structure to determine indicated active tracks; and
    performing a recovery operation of save a state, validate and/or discard for the determined indicated active tracks.

19. The system of claim 18, wherein the operations further comprise:
  in response to determining that there are no available cache control blocks to allocate for a track to add to the cache, creating an alternative block structure to represent a cache control block for the track to add to the cache;
  indicating the alternative block structure in a cache directory index also indicating the cache control blocks;
  indicating the alternative block structure in a queue;
  in response to a recovery process, determining alternative block structures indicated in the queue; and
  removing the determined alternative block structures from the cache directory index.

20. The system of claim 18, wherein the operations further comprise:
  processing track usage information in cache control blocks for the indicated active tracks to determine whether the tracks indicated as active in the active track data structure are active, wherein the recovery operation is performed with respect to those tracks indicated as active in the active track data structure that are also determined active from the track usage information.

21. A method for managing tracks in a storage in a cache, comprising:
  maintaining an active track data structure indicating tracks in the cache that have an active status;
  setting an active bit in a cache control block for a track to indicate active for the track indicated as active in the active track data structure; and
  in response to processing the cache control block, determining from the cache control block for the track whether the track is active or inactive to determine processing for the cache control block.

22. The method of claim 21, wherein the determining from the cache control block whether the track is active is performed in response to releasing a lock on the cache control block for the track, wherein the operations further comprise:
  processing usage information for the cache control block to determine whether the track is active in response to the active bit for the track indicating the track is active; and
  in response to determining that the processing the usage information indicates the track is inactive, performing:
  indicating in the active track data structure that the track is inactive; and
  setting the active bit in the cache control block for the track to indicate inactive.

23. The method of claim 21, wherein the active track data structure comprises a bitmap including bits for cache control blocks, wherein a bit for a cache control block indicates whether a track identified by the cache control block is active or inactive, wherein the bits of the bitmap are implemented in cache lines, wherein the operations further comprise:
  obtaining a lock on a cache line having a portion of the bitmap including a bit for the cache control block;
  setting the bit in the bitmap for the cache control block to indicate active or inactive in response to locking the cache line; and
  releasing the lock on the cache line in response to setting the bit for the cache control block.

24. The method of claim 21, further comprising:
  in response to a recovery process during initialization of a system including the cache after a system failure, performing:
  processing the active track data structure to determine indicated active tracks; and
  performing a recovery operation of save a state, validate and/or discard for the determined indicated active tracks.

25. The method of claim 24, further comprising:
in response to determining that there are no available cache control blocks to allocate for a track to add to the cache, creating an alternative block structure to represent a cache control block for the track to add to the cache;
indicating the alternative block structure in a cache directory index also indicating the cache control blocks;
indicating the alternative block structure in a queue;
in response to the recovery process, determining alternative block structures indicated in the queue; and
removing the determined alternative block structures from the cache directory index.

\* \* \* \* \*